United States Patent
Glendenning (10) Patent No.: US 11,254,360 B2
(45) Date of Patent: Feb. 22, 2022

(54) MECHANICALLY DRIVEN AND STEERABLE AGRICULTURAL CART

(71) Applicant: Lynx Ag, LLC, Churdan, IA (US)

(72) Inventor: Lance Glendenning, Churdan, IA (US)

(73) Assignee: Lynx Ag, LLC, Churdan, IA (US)

( * ) Notice: Subject to any disclaimer, the term of this patent is extended or adjusted under 35 U.S.C. 154(b) by 115 days.

(21) Appl. No.: 16/789,934

(22) Filed: Feb. 13, 2020

(65) Prior Publication Data
US 2020/0262476 A1 Aug. 20, 2020

Related U.S. Application Data

(60) Provisional application No. 62/805,586, filed on Feb. 14, 2019.

(51) Int. Cl.
*B62D 13/02* (2006.01)

(52) U.S. Cl.
CPC .................. *B62D 13/025* (2013.01)

(58) Field of Classification Search
CPC .... B62D 13/00; B62D 13/005; B62D 13/025; B62D 13/02; B62D 63/062; B62D 63/06; B62D 61/00; B62D 61/10

USPC ..................... 280/426, 442, 460.1
See application file for complete search history.

(56) References Cited

U.S. PATENT DOCUMENTS

| | | | |
|---|---|---|---|
| 1,158,155 A * | 10/1915 | Aleshire | B62D 13/02 280/102 |
| 7,874,590 B1 | 1/2011 | Schubert et al. | |
| 9,022,409 B2 | 5/2015 | Montag | |
| 9,914,478 B2 | 3/2018 | Montag | |
| 10,220,664 B1 * | 3/2019 | Brey | B60G 5/02 |
| 2016/0251029 A1 | 9/2016 | Montag | |

* cited by examiner

*Primary Examiner* — Kevin Hurley
*Assistant Examiner* — Hosam Shabara
(74) *Attorney, Agent, or Firm* — McKee, Voorhees & Sease, PLC (57) ABSTRACT

A steerable cart or trailer is towed by another vehicle. A reverse linkage made up of arms that crisscross one another extends between the tow vehicle and the steerable trailer. The linkage arms are parallel a distance from the tow vehicle before crisscrossing with one another towards the trailer. The linkage arms are rotatable at each end. This allows the arms to rotate in a manner in which the trailer will more closely follow the path of the tow vehicle, especially when the tow vehicle is in the process of turning. The trailer will follow in a manner that reduces compaction and provides a simpler overall operation of equipment.

17 Claims, 7 Drawing Sheets

MECHANICALLY DRIVEN AND STEERABLE AGRICULTURAL CART

CROSS-REFERENCE TO RELATED APPLICATIONS

This application claims priority under 35 U.S.C. § 119 to provisional patent application U.S. Ser. No. 62/805,586, filed Feb. 14, 2019. The provisional patent application is herein incorporated by reference in its entirety, including without limitation, the specification, claims, and abstract, as well as any figures, tables, appendices, or drawings thereof.

FIELD OF THE INVENTION

The invention relates generally towards towed trailers and other vehicles. More particularly, but not exclusively, the invention relates towards an improved steering system for a towed vehicle, such as a towed agricultural implement or vehicle.

BACKGROUND OF THE INVENTIONS

Towed vehicles, including, but not limited to agricultural carts and trailers, are intended to follow the drive vehicle (e.g., implement, tractor, or other vehicle) as closely as possible, especially with respect to the path of the wheels. Mechanically steering carts and other towed vehicles has been accomplished using tie-rods and pivoting wheels, especially within the agricultural industry.

For example, U.S. Pat. No. 9,022,409 includes tie-rods connected to the wheels of the towed vehicle, wherein the wheels are steered, but the frame of the cart is not.

U.S. Pat. No. 10,137,951 discloses a steering mechanism that includes multiple linkage arms and multiple connections.

Still other driven or towed vehicles include hydraulic actuators to steer the wheels of the vehicles.

However, in any of the previous cases, the steering systems consist of at least ten pivot points and move only the wheels, which creates an optical illusion from the cab of the drive or tow vehicle that the cart is in a different position than it actually is due to tires on the towed vehicle turning and not the body of the towed vehicle.

Therefore, there is a need to have a towed or driven vehicle that can be mechanically steered with less parts that includes less maintenance, is stronger, and is cheaper to build.

SUMMARY OF THE DISCLOSURE

Therefore, it is a principal object, feature, and/or advantage of the disclosed features to overcome the deficiencies in the art.

Another object, feature, and/or advantage of the invention is to have a towed or driven vehicle in which the whole axle of the driven vehicle is steered.

It is another object, feature, and/or advantage of the invention to eliminate the need for expensive hydraulic and electronic drive systems that are used to steer towed vehicles.

It is still another object, feature, and/or advantage of the invention to simply and efficiently guides the driven vehicle in the same track as the drive vehicle which allows for less compaction, less crop damage and simpler overall operation of equipment.

It is a further object, feature, and/or advantage of the invention to provide a towed vehicle that will substantially follow the towing or drive vehicle as closely as possible.

It is preferred the apparatus be safe, cost effective, and durable.

Methods can be practiced which facilitate use, manufacture, assembly, maintenance, and repair of a towed vehicle accomplishing some or all of the previously stated objectives.

According to at least some aspects of the disclosure, a steerable trailer includes a main frame comprising wheels on opposite sides, and a steering assembly operatively attached to the main frame. The steering assembly comprises first and second arms extending forwardly from the main frame, with the first and second arms each being pivotably attached to the main frame and including angled portions that intersect with one another and parallel portions extending from the angled portions.

According to at least some embodiments, the first and second arms of the steering assembly further comprises first and second distal ends having pivotable attachments.

According to at least some embodiments, a hitch assembly is connected to the pivotable attachments of the first and second distal ends of the first and second arms.

According to at least some embodiments, the pivotable attachments of the first and second distal ends of the first and second arms are connected to a towing vehicle.

According to at least some embodiments, the towing vehicle comprises an implement with a toolbar.

According to at least some embodiments, the first arm is attached to the main frame at a first end of the main frame, and the angled portion extending at least partially towards a second end of the main frame.

According to at least some embodiments, the angled portion have a lateral component and a longitudinal component away from the main frame.

According to at least some embodiments, the second arm comprises an opposite lateral component, and a similar longitudinal component as the first arm.

According to at least some embodiments, the angled portions of the first and second arms are substantially equal in length.

According to at least some embodiments, the first and second arms crisscross one another at the intersection.

According to additional aspects, a steerable vehicle includes a main frame comprising wheels on opposite sides of a first bar, and a second bar connected to the first bar and generally parallel thereto, with said second bar having a front and a rear. A steering assembly is rotatably connected to the main frame, with said steering assembly comprising a first steering bar rotatably connected at a first point of the second bar of the main frame, and a second steering bar rotatably connected at a second point of the second bar of the main frame. The first and second steering bars comprise angled sections that crisscross with one another at a location proximal the main frame.

According to at least some embodiments, the first and second bars have generally parallel sections extending from the angled sections towards a location distal to the main frame.

According to at least some embodiments, the first and second bars of the main frame are connected by first and second riser arms.

According to at least some embodiments, the main frame further comprises a brace between the first and second riser arms.

According to at least some embodiments, one of the first and second steering bars comprises an upper and lower portion, and the opposite steering bar extends generally between the upper and lower portions.

According to at least some embodiments, an attachment portion is at the distal end of the steering assembly to connect to a tow vehicle.

According to at least some embodiments, the attachment portion comprises a hitch.

According to at least some embodiments, the main frame is connected to the steering assembly via four rotatable connection points.

According to additional aspects, a method of steering a trailer includes connecting a tow vehicle to a trailer frame with first and second arms, wherein the first and second steering arms crisscross with one another between the tow vehicle and the trailer frame; turning the tow vehicle to correspondingly turn the main frame via the crisscrossed first and second steering arms.

According to at least some embodiments, the first and second steering arms include generally parallel portions adjacent the tow vehicle, and crisscross adjacent the trailer frame.

These and/or other objects, features, and advantages of the disclosure will be apparent to those skilled in the art. The present invention is not to be limited to or by these objects, features and advantages. No single embodiment need provide each and every object, feature, or advantage. Still further, it should be appreciated that any of the individual objects, features, embodiments, and/or advantages may be combined with any of the other individual objects, features, embodiments, and/or advantages, including if explicitly disclosed herein or inherent to one skilled.

Various embodiments of the present disclosure illustrate several ways in which the present invention may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes.

DETAILED DESCRIPTION OF THE INVENTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms such as first, second, vertical, horizontal, top, bottom, upper, lower, front, rear, end, sides, concave, convex, and the like, are referenced according to the views presented. These terms are used only for purposes of description and are not limiting unless these terms are expressly included in the claims. Orientation of an object or a combination of objects may change without departing from the scope of the invention.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

The invention disclosed herein is directed towards a cart or trailer 10, which may be referred to as a towed or driven vehicle. It should be appreciated that the terms towed vehicle, driven vehicle, cart, and/or trailer can be used interchangeably to describe aspects of the invention, which includes a device that is mechanically steerable. The towed cart or trailer 10 is connected to a drive or towing vehicle, which is not shown in many of the figures. However, it is to be appreciated that the towing or drive vehicle can be a tractor, implement with a toolbar, other implement, truck, semi, autonomous vehicle, all-terrain vehicles (ATV), utility vehicle, or generally any other vehicle for towing and providing steering to the cart 10.

As the cart is being pulled, it is desirable for the cart to be steered in a manner in which the cart 10 follows or substantially follows the drive vehicle. Therefore, as will be understood, aspects of the invention provide for the cart 10 being steerable in a simple and mechanical manner in which the axle of the cart 10 will be steered to substantially follow the path of the drive vehicle. This is advantageous as the design simply and efficiently guides the cart 10 in substantially the same track as the drive vehicle, which results in less soil compaction, less crop damage, and provides a simpler overall operation of the equipment. As will be further understood, the invention provided herein eliminates or otherwise mitigates the need for expensive hydraulic and electronic systems, and simplifies the operator's job, while reducing the problem of an optical illusion created by not steering the entire driven vehicle, as is the case with known steerable cart.

FIGS. 1-4 disclose a cart 10 including aspects of the invention, which include a steering assembly 20. As will be understood, two arms are fastened to the axle of the cart with a hinge point allowing the arms to pivot side to side and cross one another as they extend forward to and towards the drive vehicle, where they are attached independently of one another to pivoting connectors (e.g., ball hitches). This design simply and efficiently guides the cart in the same track as the drive vehicle. Such a design comprises four pivot points for less maintenance, stronger design, and a design which is cheaper to build. Furthermore, the design provides the whole axle of the cart being steered, which eliminates the aforementioned optical illusion.

Therefore, as is shown in FIGS. 1-4, a cart 10 includes a main frame 12, which may also be referred to as an axle frame 12. The axle frame 12 comprises a lower crossarm 14 and upward and forward extending riser arm 17. Connected to the lower crossarm 14 and the riser arm 17 are axles 16 to which are connected wheels or tires 15. Still further, tracks could be positioned at the axles 16. At a distal end of the riser arms 17 are a brace 19 as well as an upper crossarm 18. The upper crossarm 18 can be used to connect to a drive or tow vehicle, while the brace 19 provides structural integrity for the frame 12.

The components of the main frame 12 can comprise tubing, such as square or rectangular tubing and the components can be fastened to one another in generally any manner, such as but not including, welding, mechanical fasteners, or casting as one piece. Fasteners that rely on some mechanical principle (i.e. not adhesives) and are semi-permanent (i.e. unlike clamps). Furthermore, components of the frame 12 can be fabricated in such as manner whereas other components such as the axles can be attached via welding, mechanical fasteners, or the like. The upper crossarm 18 is shown to be generally C-shaped including an upper portion 18a and a lower portion 18b extending out from a vertical portion 18c. Various apertures and other holes are punched through the portions of the c-shaped upper crossarm 18.

Attached to the upper crossarm 18 and extending generally therefrom in a forward manner is a steering assembly 20. The steering assembly 20 is pivotably connected to the main frame 12 such that the main frame 12 and the steering assembly 20 are movable independent of one another. However, as the components of the steering assembly 20 and the main frame 12 are connected, the components will move generally with one another to provide for steering to the main frame, which includes steering of the entirety of the main frame 12. The steering assembly 20 comprises generally a first arm 22 and a second arm 26. The first and second arms 26 are pivotably connected to the upper crossarm 18 of the main frame 12. For example, the first and second arms 22, 26 can be housed generally between the upper and lower portions 18a, 18b of the upper crossarm 18 with a pin or other mechanism positioned generally through the upper and lower portions, as well as through a hollow portion of the arms themselves. Therefore, these points of connections can be referred to as a first pin connection 25 and a second pin connection 29, as is shown in the figures. Such a connection will allow for rotating or pivotal movement of the arms 22, 26 relative to the generally stationary upper crossarm 18.

Figure 1:
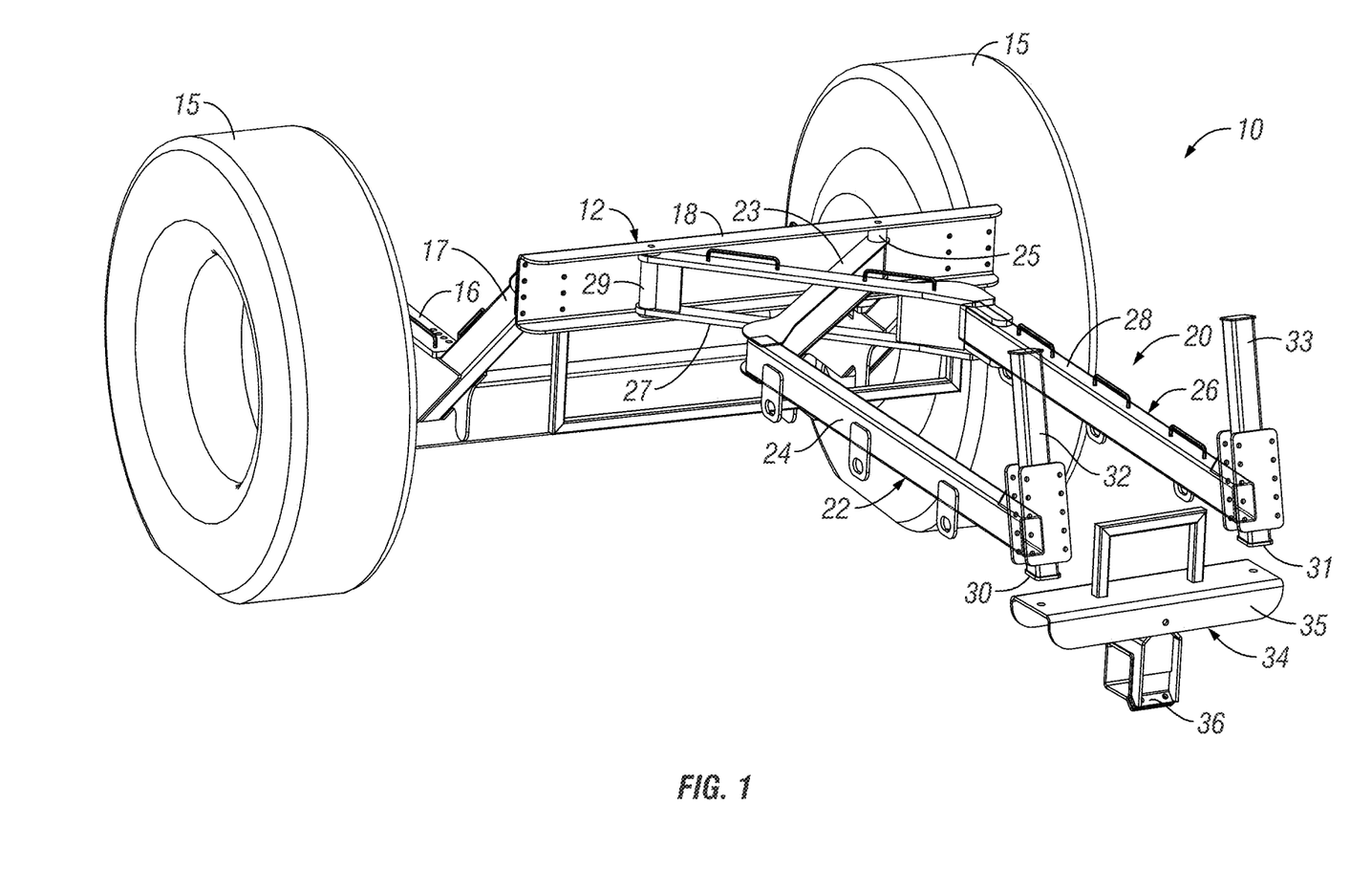
FIG. 1 is a perspective view of a cart that can be driven or towed and that includes aspects of the invention.
Figure 2:
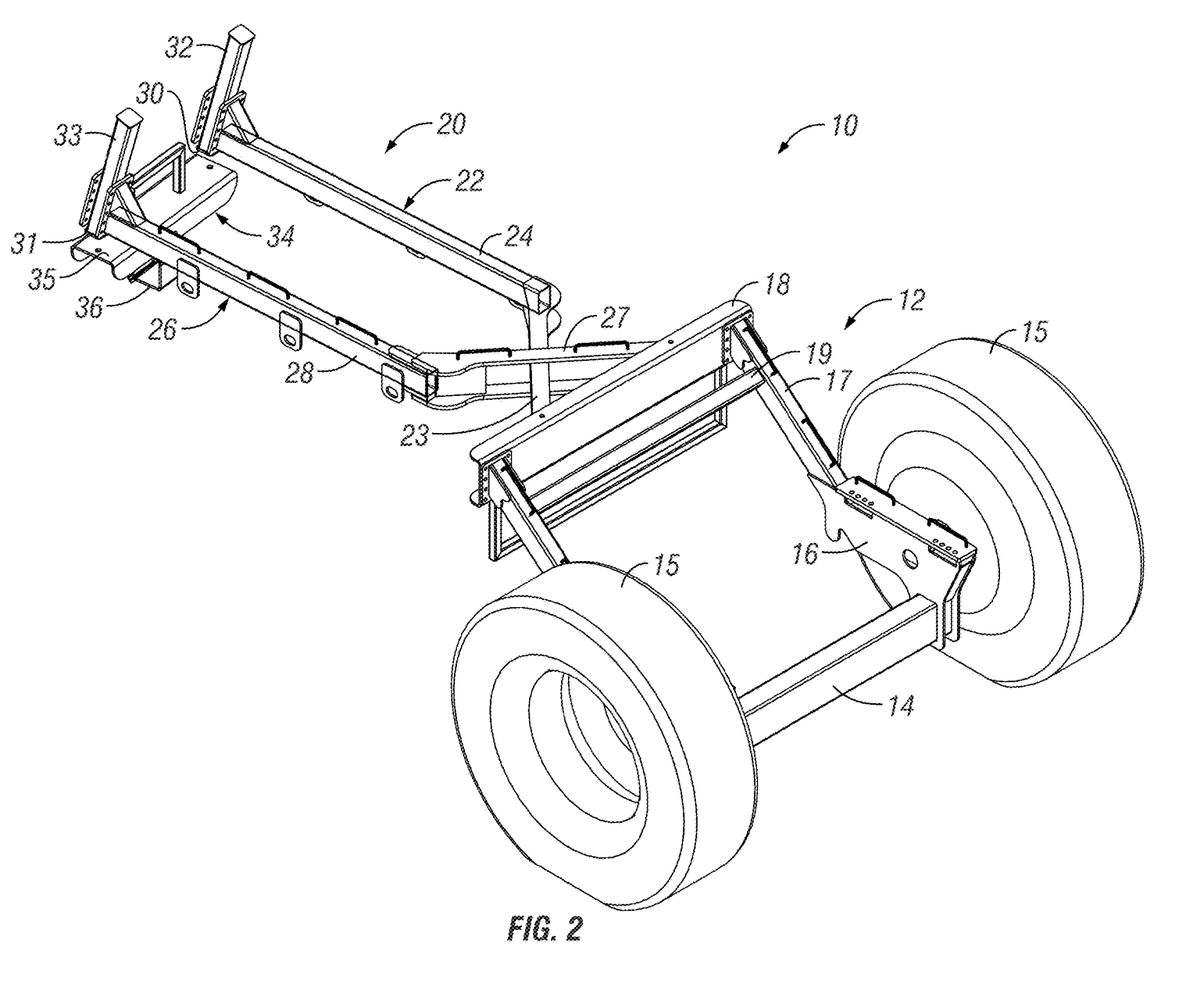
FIG. 2 is another perspective view of the cart of FIG. 1.
Figure 3:
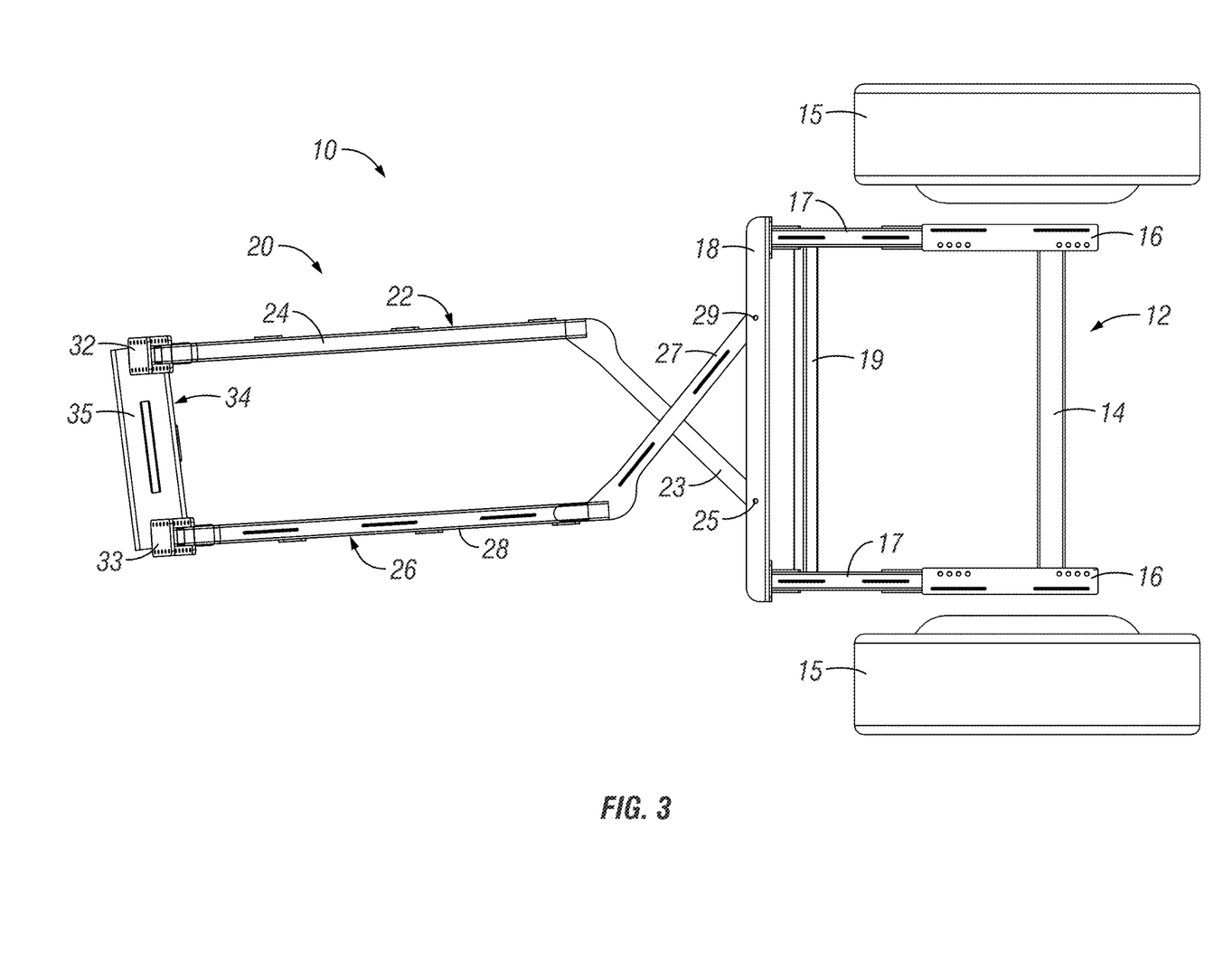
FIG. 3 is a top plan view of the cart of FIG. 1.
Figure 4:
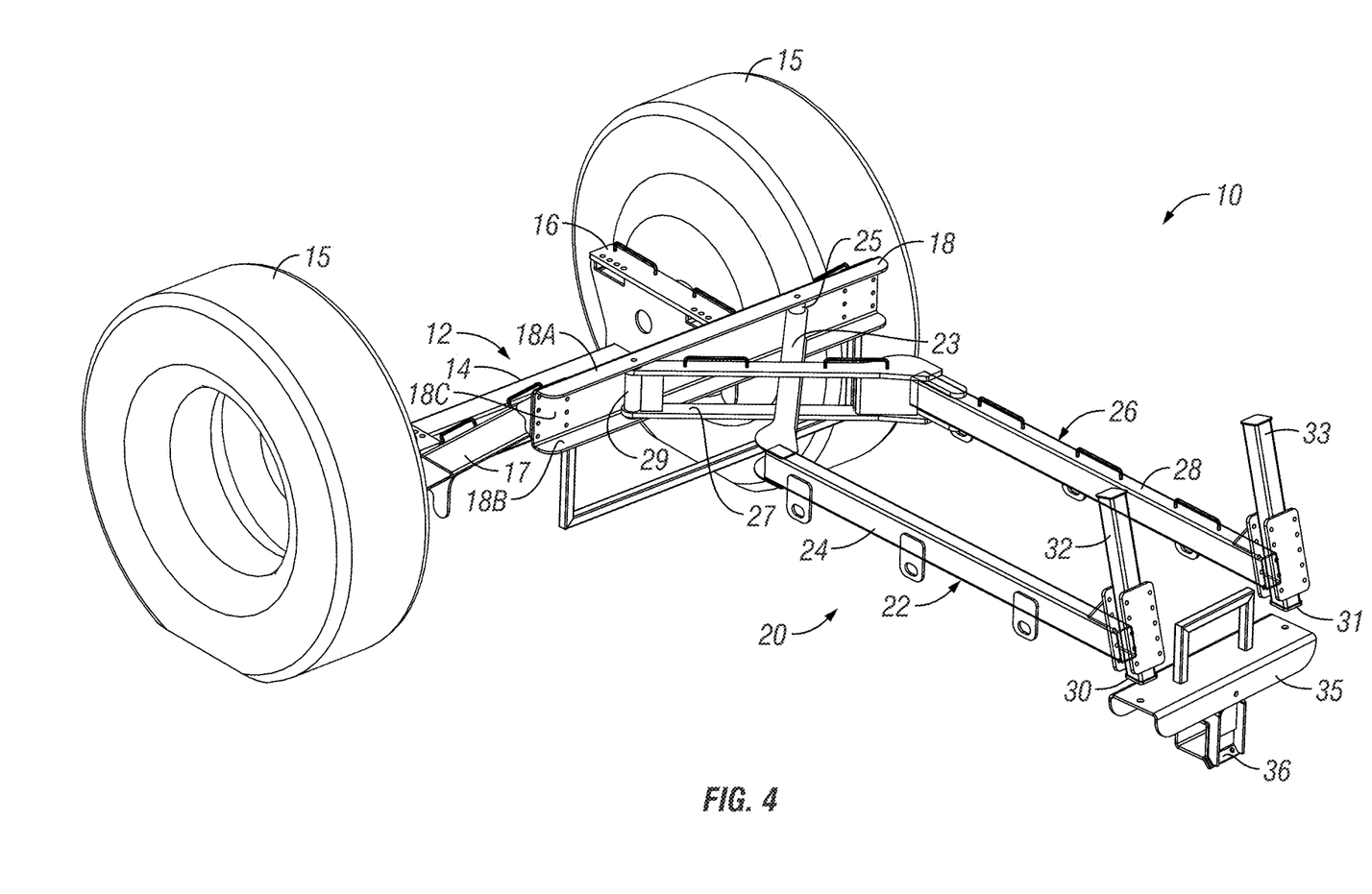
FIG. 4 is another perspective view of the cart of FIG. 1.

Furthermore, as is shown, the first arm 22 comprises an angled portion 23 and a parallel portion 24. Likewise, a second arm 26 includes an angled portion 27 and a parallel portion 28. The parallel portions 24, 28 refer to the sections of the first and second arms 22, 26 that are substantially parallel to one another. Such is shown in FIG. 3, which is a top plan view of the cart 10 in which the arms are shown to be generally parallel at the parallel portions 24, 28. The angled portions 23, 27 are shown to crisscross one another prior to the parallel portions. For example, the angled portions of the arms extend at an angle relative to the upper crossarm 18 extending from the first and second pins 25, 29 with one of the angled arms passing through the other. As is shown in the figures, the first angled portion 23 extends through a portion of the second angle portion 27 of the second arm 26. However, it should be appreciated that this could be reversed and is not easy to be in the exact configuration shown in the figures. The angled portions 23, 27 terminate generally at the parallel arms 24, 28, such as at proximal ends of the parallel arms. The parallel arms will then extend generally forward from the termination of the angled arms 23, 27 towards distal ends of the parallel arms 24, 28. The first and second arms, including the angled and parallel portion can comprise single members, which are cast or otherwise formed of a single piece, or can be mechanically fastened to one another such as but not limited to by welding, mechanical fasteners, or other mechanical or non-mechanical fastening means. Furthermore, the lengths of the angled and parallel portions of the first and second arms 22, 26 need not be as exact and/or explicit as that shown in the figures and can generally take other lengths depending on the amount of turn radius desired for a particular cart or other towed vehicle.

Therefore, as is understood, the first and second arms 22, 26, connected to the upper crossarm 18 such as in a pivotal manner provides for a sort of reverse linkage that is used to mechanically steer the axle of the cart 10. As will be understood, the distal ends of the arms can be connected to a tow vehicle or drive vehicle such that the reverse linkage will move or otherwise steer the axle in a similar manner of the drive vehicle to allow a similar path to be taken by the cart 10 and to also provide for a clear view of the steered cart by an operator.

At a distal end of the first and second arms 22, 26 include connections to a drive vehicle. For example, the connections can take the form of a mount 34 including a hitch 36 connected to a base 35. The hitch can be used to connect to a drive or tow vehicle, such as an implement, tractor, or the like. When an implement is used as the drive vehicle, the hitch can be connected to a toolbar such that the mount is a toolbar mount 34. As mentioned, the mount includes a base 35. The base can be connected to the steering assembly 20, such as via the first and second vertical bar 32, 33, positioned at the distal ends of the first and second arms 22, 26. Pins or other pivoting members can be positioned at the location shown at the third pin 30 and the fourth pin 31. For example, a ball hitch can be placed at each of the locations 30 and 31 and can be connected to the arms via a ball hitch connector positioned at the distal ends of each of the first and second arms. Furthermore, other pins can be connected such as via the vertical members 32, 33 connecting to the pins 30, 31 to allow for the rotational or pivoting movement of the arms relative to the mount 34. Therefore, the movement of the mount 34 will provide the steering to each of the arms via the pivoting or rotating pins 30, 31. As the mount is connected to the drive vehicle, the rotational or turning movement of the mount will exert force on each of the arms 22, 26 in the form of a push and a pull to the arms. Such a push and pull to the arms will be exerted through the arms and to the upper crossarm 18 via the first and second pins 25, 29 wherein the upper crossarm will move due to the push and pull of the arms. This movement of the upper crossarm 18 will cause the entirety of the main frame 12 to be moved in similar or like manner, constituting a steering of the entirety of the main frame, and not just the individual wheels connected thereto. Such an arrangement provides for greater control over the steering and for control over viewing the steering by an operator of the tow or drive vehicle.

Figure 5:
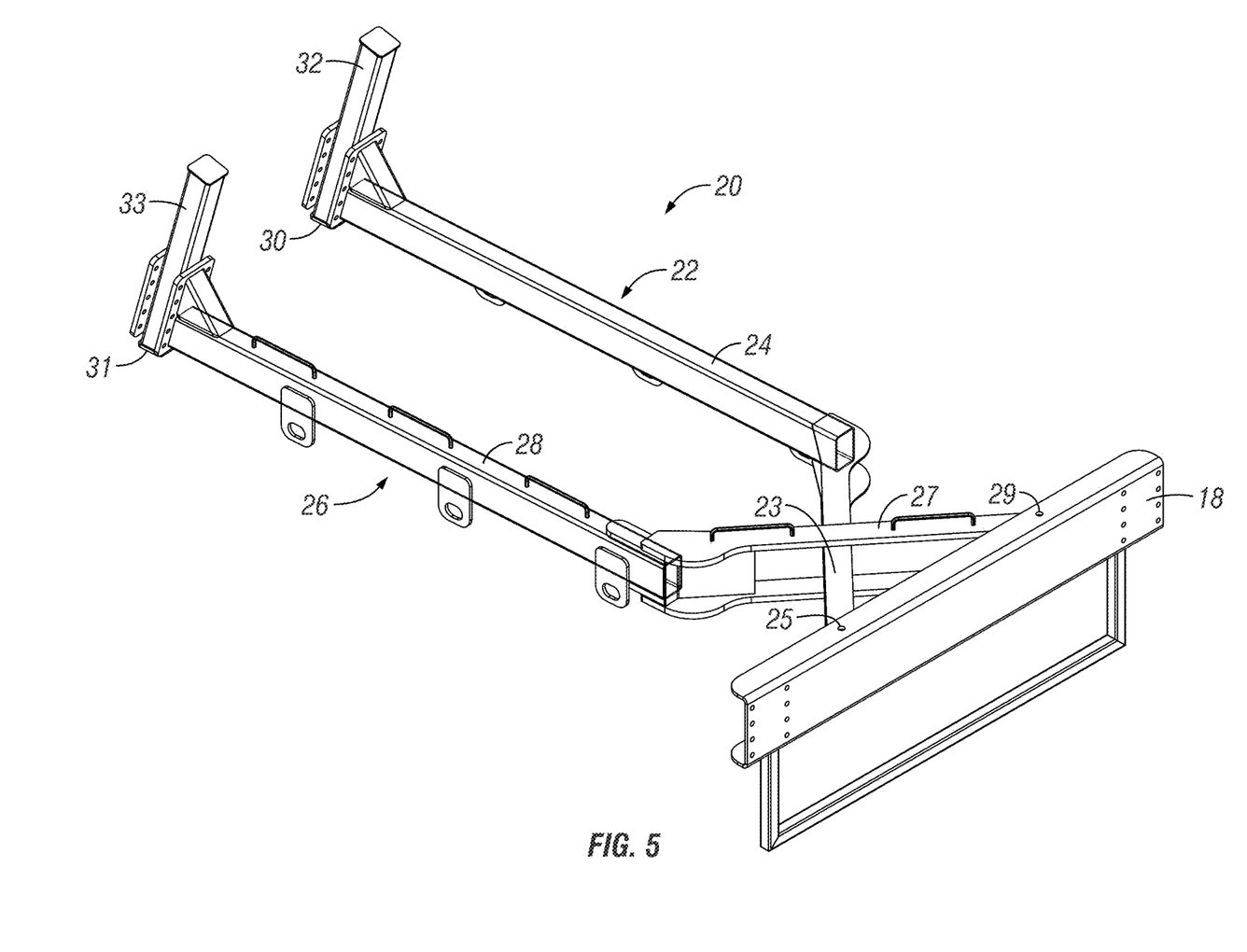
FIG. 5 is a perspective view of the cart of FIG. 1 with some components removed to show the steering assembly according to some aspects of the invention.
Figure 6:
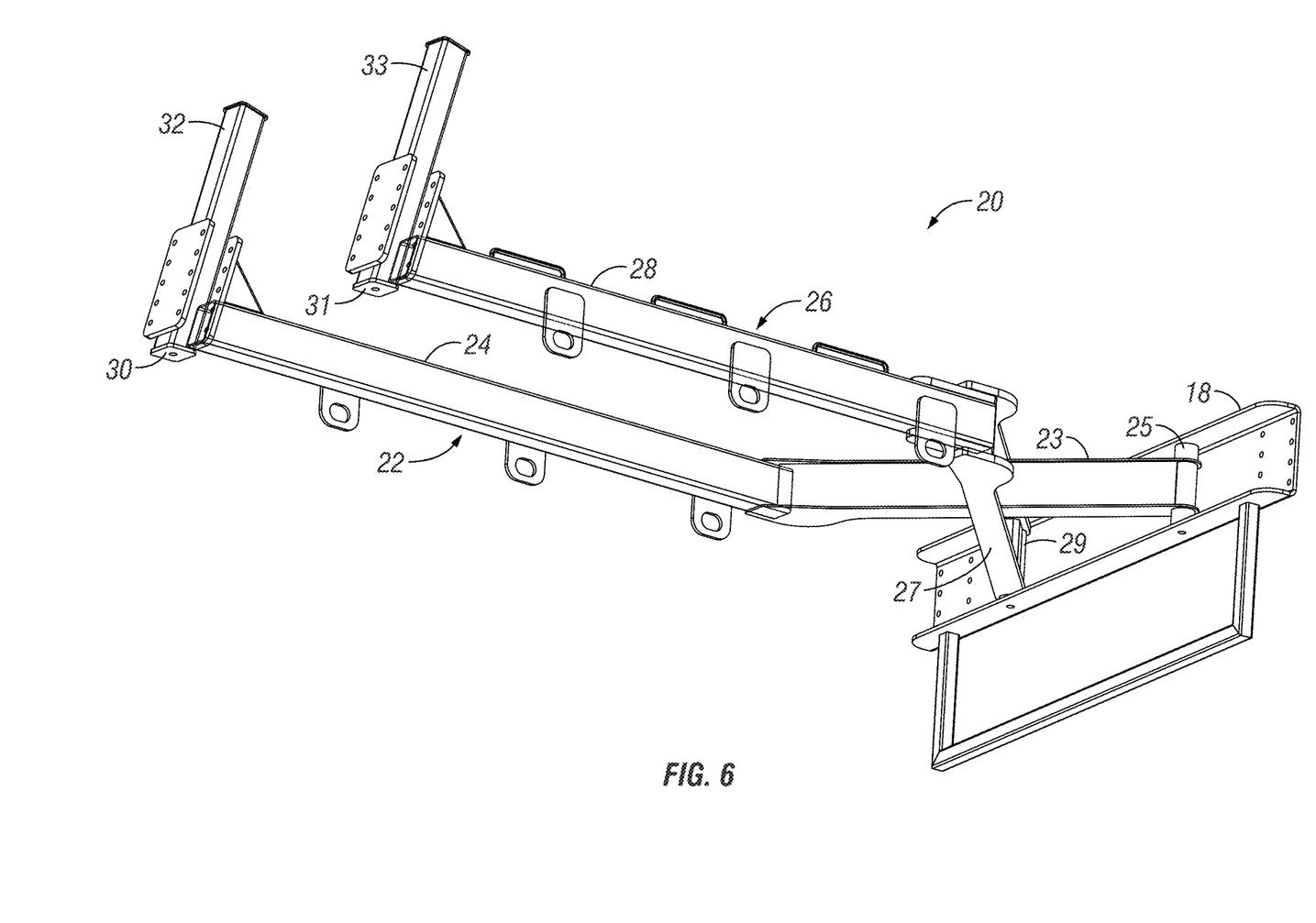
FIG. 6 is another view of the components shown in FIG. 5.

FIGS. 5 and 6 are views of the steering assembly 20 with a majority of main frame 12 removed. The mount 34 is also removed. Thus, the upper crossarm 18 is included and the views show greater details how the arms 22, 26 are rotatably or otherwise pivotably connected to the crossarm 18 such as at the first and second pins 25, 29. In addition, the figures show the arms extending the angular manner which they crisscross one another and extend in a parallel manner towards the distal ends of the arms and terminating generally at the third and fourth pins 30, 31. Therefore, it can be understood that the connection of the third and fourth pins 30, 31 will provide a push and pull on one of the first and second arms to exert a force upon the crossarm 18 constituting a steering of the crossarm and thus the mainframe of the cart 10. Such a reverse linkage with crisscrossing arms provides for greater control and greater movement and movability of the cart over a standard four bar linkage with only parallel arms connecting the four pins, in which the cart will not be controlled as well.

Figure 7:
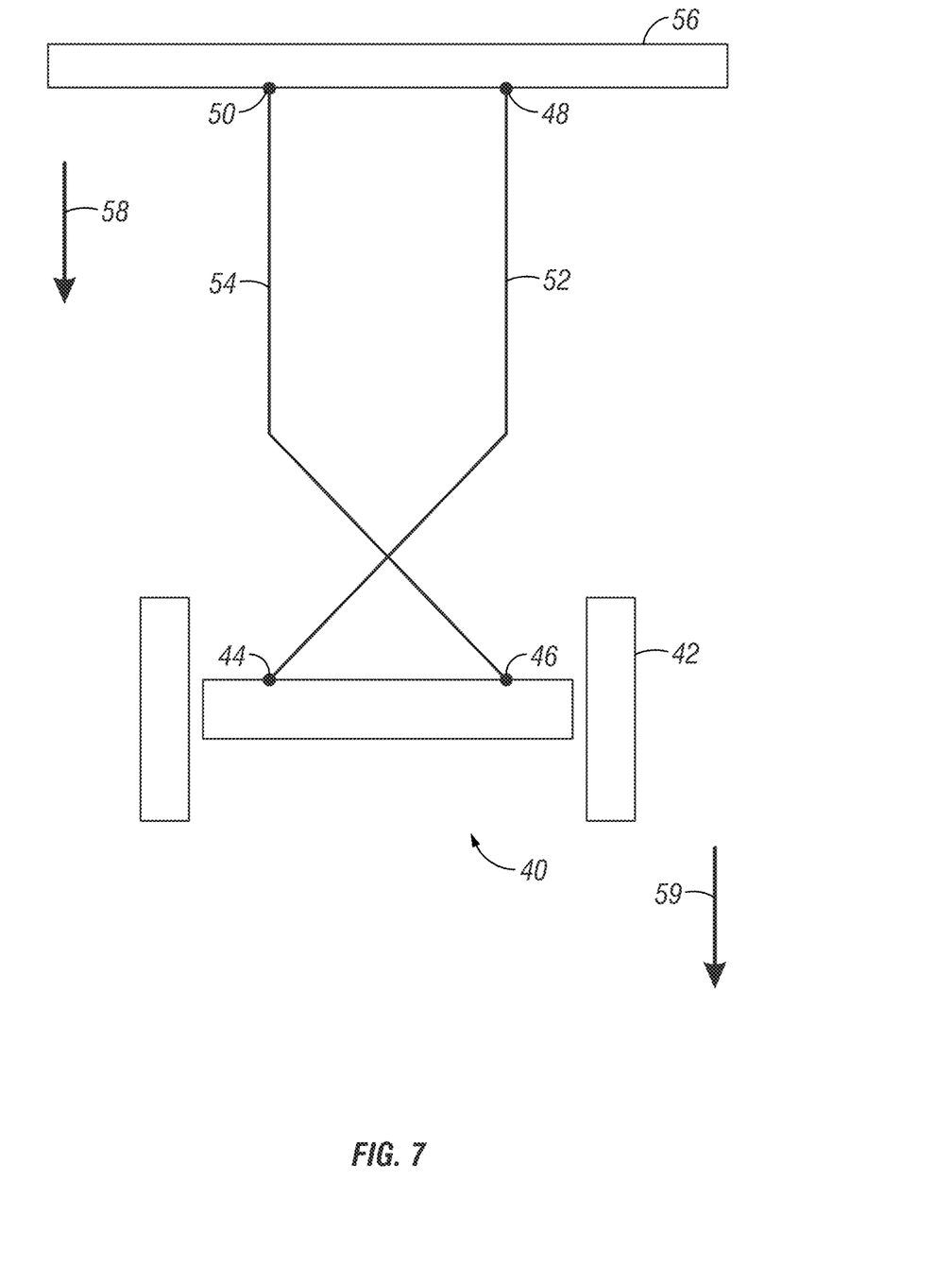
FIG. 7 is a schematic of a cart including the steering assembly according to aspects of the invention.

FIG. 7 is a schematic showing the system including a towed cart 40 connected to a drive or towing implement 56. The implement is in the form of a toolbar 56 extending a length. As shown in the schematic of FIG. 7, the steering system comprises four pins including a first pin 44, a second pin 46, a third 48, and a fourth pin 50. The first and third pins 44, 48 are connected to one another via a first arm 52. The second and fourth pins 46, 50 are connected to one another via a second arm 54. It is to be appreciated that each of the pins are pivotal, rotatable, otherwise movable in a rotational manner. Therefore, the schematic shown in FIG. 7 provides for easy to understand schematic and description of aspects of the invention. As has been described herein, each of the first and second arms 52, 54 includes an angled portion and forward extending portion. The angled portions crisscross one another to form a sense of a reverse linkage mechanism. Such a reverse linkage provides for greater control in steering of the cart 40 by the implement 56. For example, in a standard linkage without the crisscross portions, when then left side of the implement would move in the direction shown by the arrow 58, this would push the likewise left side of the cart, which would cause an extreme turn of the cart. However, with the reverse linkage shown in FIG. 7, the movement of the toolbar and the arm in the direction of the arrow 58 is what will actually push the right side (i.e., 46) of the cart 40 in a similar manner, such as in the direction of the arrow 59, while pulling the first bar 52 and causing the left side (i.e., 44) of the cart to move in the opposite direction of the arrow 59. This will provide for the cart to swing a bit in an opposite manner of that of the toolbar 56, which will allow for the cart to follow the path of the toolbar or other drive vehicle much closer. Such a following of the cart to the toolbar will provide the advantage has been disclosed herein in which include, but which are not limited to less compaction, less crop damage, and simpler overall operation of the equipment. The pushing and pulling of the opposite side of the cart via the movement of the toolbar will allow the cart to follow essentially the path of the toolbar or other drive vehicle in a manner which is desirable by the operator.

Therefore, a driven cart or otherwise towed vehicle has been herein shown and described and includes a steering assembly or system that steers the entirety of the cart, and not the individual wheels to provide for a better following and steering and control of the cart. The disclosure is not to be limited to the particular embodiments described herein, including the sizes, shapes, and connection means shown and described herein. It is to be appreciated that variation which are obvious to those skilled in the art are to be intended as included as part of the invention disclosed herein. Furthermore, it is to be appreciated that any of the components of any of the individual figures are to be interchangeable with any of the other components of any of the other figures of the present disclosure in a manner which will not materially affect or otherwise change the invention as disclosed herein.

The invention claimed is:

1. A steerable trailer, comprising:
  a main frame comprising wheels on opposite sides;
  a steering assembly operatively attached to the main frame, the steering assembly comprising:
    first and second arms extending from the main frame forwardly, the first and second arms each being pivotably attached to the main frame and including angled portions that intersect with one another and parallel portions extending from the angled portions; and
  a hitch assembly connected to the pivotable attachments of the first and second distal ends of the first and second arms;
  wherein the first and second arms of the steering assembly further comprises first and second distal ends having pivotable attachments.

2. The steerable trailer of claim 1, wherein the pivotable attachments of the first and second distal ends of the first and second arms are connected to a towing vehicle.

3. The steerable trailer of claim 2, wherein the towing vehicle comprises an implement with a toolbar.

4. The steerable trailer of claim 1, wherein the first arm attached to the main frame at a first end of the main frame, and the angled portion extending at least partially towards a second end of the main frame.

5. The steerable trailer of claim 4, wherein the angled portion having a lateral component and a longitudinal component away from the main frame.

6. The steerable trailer of claim 5, wherein the second arm comprising an opposite lateral component, and a similar longitudinal component as the first arm.

7. The steerable trailer of claim 6, wherein the angled portions of the first and second arms are substantially equal in length.

8. The steerable trailer of claim 6, wherein the first and second arms crisscross one another at the intersection.

9. A steerable vehicle, comprising:
  a main frame comprising:
    wheels on opposite sides of a first bar; and a second bar connected to the first bar and generally parallel thereto, said second bar having a front and a rear; and a steering assembly rotatably connected to the main frame, said steering assembly comprising:

a first steering bar rotatably connected at a first point of the second bar of the main frame; and a second steering bar rotatably connected at a second point of the second bar of the main frame;

wherein the first and second steering bars comprise angled sections that crisscross with one another at a location proximal the main frame.

10. The steerable vehicle of claim 9, wherein the first and second bars have generally parallel sections extending from the angled sections towards a location distal to the main frame.

11. The steerable vehicle of claim 9, wherein the first and second bars of the main frame are connected by first and second riser arms.

12. The steerable vehicle of claim 11, wherein the main frame further comprises a brace between the first and second riser arms.

13. The steerable vehicle of claim 9, wherein one of the first and second steering bars comprises an upper and lower portion, and the opposite steering bar extending generally between the upper and lower portion to crisscross with one another.

14. The steerable vehicle of claim 9, further comprising an attachment portion at the distal end of the steering assembly to connect to a tow vehicle.

15. The steerable vehicle of claim 14, wherein the attachment portion comprising a hitch.

16. The steerable vehicle of claim 9, wherein the main frame is connected to the steering assembly via four rotatable connection points.

17. A method of steering a trailer, comprising:

connecting a tow vehicle to a trailer frame with first and second arms, wherein the first and second steering arms crisscross with one another between the tow vehicle and the trailer frame;

turning the tow vehicle to correspondingly turn the trailer frame via the crisscrossed first and second steering arms;

wherein the first and second steering arms include generally parallel portions adjacent the tow vehicle, and crisscross adjacent the trailer frame.

* * * * *